US009346562B2

United States Patent
Wolfe

(10) Patent No.: US 9,346,562 B2
(45) Date of Patent: May 24, 2016

(54) AIRCRAFT TROUBLESHOOTING NETWORK

(71) Applicant: Cessna Aircraft Company, Wichita, KS (US)

(72) Inventor: Adam Blake Wolfe, Wichita, KS (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 0 days.

(21) Appl. No.: 14/244,576

(22) Filed: Apr. 3, 2014

(65) Prior Publication Data

US 2016/0101876 A1    Apr. 14, 2016

(51) Int. Cl.
| | | |
|---|---|---|
| G06F 7/70 | (2006.01) | |
| G06F 19/00 | (2011.01) | |
| G06G 7/00 | (2006.01) | |
| G06G 7/76 | (2006.01) | |
| B64F 5/00 | (2006.01) | |
| G07C 5/00 | (2006.01) | |
| B64D 45/00 | (2006.01) | |
| H04L 29/08 | (2006.01) | |
| H04W 84/10 | (2009.01) | |
| G06F 17/30 | (2006.01) | |

(52) U.S. Cl.
CPC .............. B64F 5/0045 (2013.01); B64D 45/00 (2013.01); G06F 17/30011 (2013.01); G07C 5/008 (2013.01); H04L 67/1097 (2013.01); H04W 84/10 (2013.01); B64D 2045/0085 (2013.01)

(58) Field of Classification Search
CPC ........... H04B 7/18506; H04B 7/18504; G08G 5/0013; G08G 5/0021; G08G 5/0065; G06Q 10/08; G06Q 50/28; G06Q 50/30; H04W 4/20; H04W 52/282; H04W 52/283
USPC ......... 701/3, 4, 79, 14, 31.5, 33.4, 29.1, 29.4, 701/31.4, 31.6; 340/945, 3.3, 3.5, 531, 340/539.22, 963; 455/431, 66.1, 67.11, 455/67.13, 67.16, 98
See application file for complete search history.

(56) References Cited

U.S. PATENT DOCUMENTS

| | | |
|---|---|---|
| 5,445,347 A | 8/1995 | Ng |
| 6,047,165 A | 4/2000 | Wright et al. |
| 6,092,008 A | 7/2000 | Bateman |
| 6,104,914 A | 8/2000 | Wright et al. |
| 6,108,523 A | 8/2000 | Wright et al. |
| 6,148,179 A | 11/2000 | Wright et al. |
| 6,154,636 A | 11/2000 | Wright et al. |
| 6,154,637 A | 11/2000 | Wright et al. |
| 6,160,998 A | 12/2000 | Wright et al. |
| 6,163,681 A | 12/2000 | Wright et al. |
| 6,167,238 A | 12/2000 | Wright et al. |
| 6,167,239 A | 12/2000 | Wright et al. |
| 6,173,159 B1 | 1/2001 | Wright et al. |
| 6,308,044 B1 | 10/2001 | Wright et al. |
| 6,308,045 B1 | 10/2001 | Wright et al. |
| 6,353,734 B1 | 3/2002 | Wright et al. |
| 6,522,867 B1 | 2/2003 | Wright et al. |

(Continued)

FOREIGN PATENT DOCUMENTS

WO    2005101283 A2    10/2005

*Primary Examiner* — Jaime Figueroa
(74) *Attorney, Agent, or Firm* — Lathrop & Gage LLP

(57) ABSTRACT

A global network is described for accessing aircraft remotely via a wide area network. Aircraft flight and operational data stored on the aircraft may be directly accessed via remote workstation or downloaded by centralized automatic processes for later analysis and diagnosis.

16 Claims, 2 Drawing Sheets

(56) References Cited

U.S. PATENT DOCUMENTS

| | | |
|---|---|---|
| 6,745,010 B2 | 6/2004 | Wright et al. |
| 6,775,545 B2 | 8/2004 | Wright et al. |
| 6,990,319 B2 | 1/2006 | Wright et al. |
| 7,426,387 B2 | 9/2008 | Wright et al. |
| 7,426,388 B1 | 9/2008 | Wright et al. |
| 7,428,412 B2 | 9/2008 | Wright et al. |
| 7,444,146 B1 | 10/2008 | Wright et al. |
| 7,489,992 B2 | 2/2009 | Valette et al. |
| 7,546,123 B2 | 6/2009 | Wright et al. |
| 7,620,374 B2 | 11/2009 | Ziarno et al. |
| 7,769,376 B2 | 8/2010 | Wright et al. |
| 8,335,601 B2 * | 12/2012 | Sham et al. ............ 701/3 |
| 8,351,926 B1 | 1/2013 | Wright et al. |
| 8,351,927 B2 | 1/2013 | Wright et al. |
| 8,768,534 B2 * | 7/2014 | Lentz ..................... 701/1 |
| 8,787,904 B1 * | 7/2014 | Hayes et al. ............ 455/431 |
| 2003/0032426 A1 | 2/2003 | Gilbert et al. |
| 2003/0215128 A1 * | 11/2003 | Thompson ................ 382/141 |
| 2004/0008253 A1 * | 1/2004 | Monroe .................... 348/143 |
| 2004/0193420 A1 * | 9/2004 | Kennewick et al. ...... 704/257 |
| 2004/0230352 A1 | 11/2004 | Monroe |
| 2006/0057974 A1 * | 3/2006 | Ziarno et al. ............. 455/98 |
| 2006/0206246 A1 * | 9/2006 | Walker ..................... 701/16 |
| 2006/0270354 A1 * | 11/2006 | de La Chapelle et al. ... 455/66.1 |
| 2007/0139169 A1 * | 6/2007 | Mitchell et al. .......... 340/425.5 |
| 2009/0138871 A1 * | 5/2009 | Kimberly et al. ......... 717/173 |
| 2009/0312897 A1 * | 12/2009 | Jamrosz et al. ........... 701/29 |
| 2010/0142482 A1 * | 6/2010 | Lu et al. ................... 370/331 |
| 2010/0241345 A1 * | 9/2010 | Cornell et al. ............ 701/120 |
| 2010/0312420 A1 * | 12/2010 | Sham et al. ............... 701/3 |
| 2012/0191830 A1 | 7/2012 | Scheid et al. |
| 2013/0253887 A1 * | 9/2013 | Bommer et al. .......... 703/1 |
| 2014/0036686 A1 * | 2/2014 | Bommer et al. .......... 370/241 |
| 2014/0075506 A1 * | 3/2014 | Davis et al. ............... 726/3 |
| 2015/0019065 A1 * | 1/2015 | Bollapragada et al. ...... 701/29.1 |

* cited by examiner

AIRCRAFT TROUBLESHOOTING NETWORK

BACKGROUND OF THE INVENTION

The aircraft troubleshooting network described herein provides for the enhanced management and diagnosis of aircraft. In part, the network automates the selective downloading and central storage and analysis of aircraft flight and operational data. The network also provides for remote users to directly access the aircraft to perform monitoring or diagnostic functions. The network also allows remote users to access historical data for diagnostic or analytical functions.

SUMMARY OF THE INVENTION

In one embodiment, the aircraft troubleshooting network is a system for remotely monitoring the performance of an aircraft. The system includes at least one aircraft data monitoring and recording system installed in an aircraft. The system also includes wireless access points, a data storage server, a control server, and a remote end user station, all of which are connected to a wide area network such as the Internet.

The aircraft data and monitoring system is capable of recording data for an aircraft, generating at least one metadata document describing the data, automatically connecting to the data storage server via a wireless access point at an aircraft service location, and uploading metadata documents to the control server for storage on the data storage server.

The remote end user stations are capable of selectively retrieving the data from the aircraft from the data storage server or connecting directly to the aircraft data monitoring and recording system over the wide area network and a wireless access point.

In some embodiments of the system, the control server periodically retrieves metadata documents from the data storage server and downloads the data from the aircraft monitoring and recording system via the network for storage on the data storage server.

In other embodiments of the system, an index is maintained by the control server of a list of aircraft currently connected to the network through one of the wireless access points. The remote end user stations may directly connect to an aircraft data monitoring and recording systems selected from the index maintained by the control server. The remote end user stations may perform aircraft diagnostic functions on such an aircraft.

In additional embodiments of the system, a database of historical data downloaded from the aircraft data monitoring and recording systems may be stored on the data storage server. The remote end user stations may perform diagnostic functions on the database of historical data for an aircraft when it is not connected to the network.

In embodiments, the control server prioritizes the download of data from the aircraft data monitoring and recording system based on the existence of one or more priority flight events or triggers that occurred recording of the data. The priority flight events or triggers may include desired flight profile information, system logic conditions, and system exceedances. System exceedances occur when system parameters exceed certain threshold values, which could mean in this context that a parameter is either greater or less than the threshold value as appropriate for the particular parameter. The metadata document may include an aircraft identifier, a data type identifier, data collection time information, flight event information and data location information.

The described system may be used for monitoring the performance of an aircraft. One method of using the system includes recording aircraft data on the aircraft data monitoring and recording system, creating a metadata document describing the aircraft data, automatically connecting the aircraft data monitoring and recording system to a wireless access point, and initiating an upload of the metadata document from the aircraft data monitoring and recording system to the control server for storage in the data storage server.

In some embodiments the method may also include periodically and selectively retrieving a set of metadata documents from the data storage server to the control server, and downloading the data described in the set of metadata documents to the data storage server. The set of metadata documents may be selectively retrieved based on criteria such as prior download status, priority flight events, data collection time, and data type.

In some embodiments the method may also include the step of maintaining an index of the aircraft currently connected to a wireless access point. The user may then remotely access a first aircraft data monitoring and recording system selected from the index from a remote end user station, and perform aircraft diagnostic functions on the aircraft from the remote end user station.

In an embodiment the method also includes the step of storing data downloaded from the aircraft data monitoring and recording system in a historical database stored on the data storage server. The user may then use a remote end user station to perform analytical functions on the data in the historical database for the aircraft data monitoring and recording system.

DETAILED DESCRIPTION

The global aircraft troubleshooting network disclosed herein comprises a system of components that are utilized to provide remote access to data and to analysis and diagnostic functions on an aircraft from a remote workstation. The system provides for automatic connection of the aircraft data monitoring and recording system to a wireless access point located at a service location for the aircraft. The aircraft data monitoring and recording system collects and record flight data during aircraft operation, and may be incorporated into or part of the flight data recorder or black box of the aircraft. It also has functionality to connect to a wireless network access point as further described below.

The system utilizes a plurality of wireless access points located at a variety of service locations to increase the frequency with which an aircraft will be in proximity to one of the wireless access points. The service locations at which wireless access points may be installed include, without limitation, airports, hangars, refueling stations, aircraft maintenance or service facilities, or other typical facilities where aircraft are stored, operated or handled on the ground.

Centralized servers receive automatic data transfers from the aircraft data monitoring and recording system of metadata described the flight and operational data currently stored in the system. The centralized servers may then selectively download and store data from the aircraft data monitoring and recording system. The centralized servers may also maintain an index or list of aircraft currently connected to the network.

Remote work or end user stations are provided for a user to access the system. Remote end user stations may access metadata and historical flight and operational data for an aircraft from the centralized servers. They may also access the list of currently connected aircraft from the centralized servers and then directly access an aircraft that is currently connected to a wireless access point to access data or perform diagnostic functions.

Figure 1:
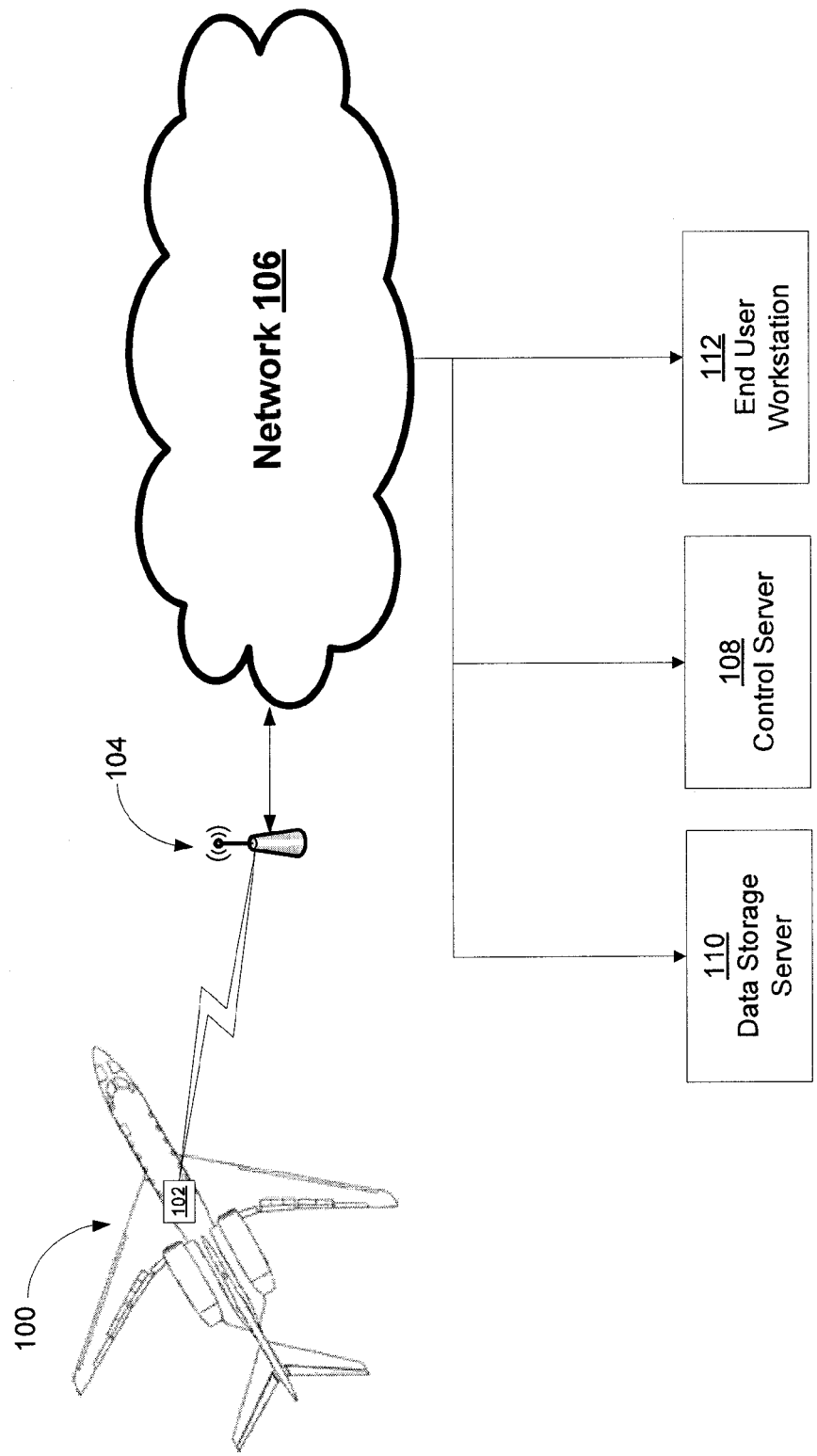
FIG. 1 is a schematic view of an embodiment of the invention.

Referring now to FIG. 1, a schematic view of an embodiment of the global aircraft troubleshooting network is depicted. An aircraft 100 may be equipped with an aircraft data monitoring and recording system 102 that collects data from various aircraft systems during aircraft operation. System 102 stores in various types of memory or other storage the collected data as records or files for later use as needed. The storage may be in any type of electronic readable storage medium, such as solid state memory, magnetic disk or tape, optical disk, or other known type of electronic storage medium. System 102 is also capable of generating metadata descriptor documents to identify and describe the collected data records or files. The metadata descriptor documents may include, without limitation, information such as the type of data, date and time of data collection, aircraft and subsystem identifiers, flight events and the location of stored data. In a preferred embodiment of the global aircraft troubleshooting network, the system 102 records data throughout aircraft operation and does not collect only snap-shot or windowed data.

In an embodiment of the invention, the system 102 is provided with the capability to wirelessly connect to external systems. This wireless connectivity may be provided by off the shelf components for wireless local area networking technologies and standards. Such standards include, without limitation, the IEEE 802.11 standards and similar existing and future technologies. The wireless connectivity may also be provided by proprietary equipment developed by the user of the network.

A plurality of wireless access points 104 are provided as part of the network and are located at aircraft service locations where aircraft stop for either short or long periods of time. These aircraft service locations may be located at airports, hangars, aircraft maintenance facilities or other locations where aircraft are operated, handled, maintained or stored on the ground. The aircraft need not be located at the service locations for an extended period of time so that refueling or loading and unloading locations may suffice as aircraft service locations. The system 102 on the aircraft 100 is designed to automatically connect to a wireless access point 104 when it is available. These access points may be secured to prevent unauthorized access to the network. Other technologies, such as data encryption and validation, may be utilized by system 102 and access point 104 to prevent unauthorized capture or unintentional corruption of the data during transmission.

Wireless access point 104 is connected via a network 106 to a control server 108 and, in some embodiments, to a data server 110. Network 106 may be a private local or wide area network or may be a global telecommunications network such as the Internet. In some embodiments a private local area network may be connected to a global public wide area network and wireless access point 104 or system 102 may utilize security technologies, such as virtual private networking or other similar technologies, to connect to another private network or private network resources.

A central control server 108 and a data storage server 110 are provided for communicating with system 102 over network 106 and through access point 104. When aircraft 100 lands at a facility with a wireless access point 104, system 102 connects to wireless access point 104 and establishes a connection via network 106 to control server 108 or, in some embodiments, data server 110. Once system 102 has established a connection with control server 108, system 102 uploads the metadata descriptor documents for the data currently stored on system 102 to control server 108.

In some embodiments, upon establishing a connection with a system 102 for an aircraft 100, control server 108 updates an index or list of currently-connected aircraft with the information for aircraft 100. This allows end user stations 112 with authorized access to control server 108 or data storage server 110 to view information about currently-connected aircraft and to connect directly to an aircraft 100 via network 106 and system 102. This allows end user stations 112 to view real-time data from the aircraft 100 and perform diagnostic and maintenance functions on the aircraft 100 from a remote workstation.

Upon connection system 102 also uploads metadata descriptor documents that describe the data stored on the system 102 to control server 108. A process on the control server 108 may then upload the metadata to the data storage server 110. The metadata is then available to be queried by server 108 or end user station 112. In a preferred embodiment, control server 108 analyzes the metadata and may selectively download desired data from system 102 for storage in a data storage server 110 based on the metadata received from system 102. Control server 108 may choose to only download certain data based on criteria related to aircraft operation or all data that has not been previously downloaded. Control server 108 may also prioritize which data is downloaded to more efficiently address time or network resource constraints. Server 108 may prioritize downloading of data that is identified as including certain specific flight events, such as priority date and time, flight profile definitions, whether system logic conditions were met, or whether thresholds for system parameters were exceeded. In some embodiments, a user may initiate data uploads from system 102 from an end user station 112. In various embodiments of the invention, the data storage server 110 may reside on the same physical hardware as control server 108 or may be located on separate hardware. Over time an historical database of data downloaded from the aircraft data monitoring and recording systems 102 is collected on the data storage server 108. Remote end user stations 112 are able to connect to the data storage server 108 and perform diagnostic and analytical functions for an aircraft even when the aircraft is not connected to network 106.

End user stations 112 may access the data for aircraft 100 on data storage server 110 even when aircraft 100 is not connected to network 106 or control server 108. This allows end user stations 112 to utilize historical data to troubleshoot aircraft problems or to research aircraft history while the aircraft is in operation. This also allows a complete record of aircraft data to be maintained on data storage server 110 for an aircraft 100 that may be available to the network infrequently. If an issue arises with aircraft 100, all the data for that aircraft is available to end user stations 112 for analysis and diagnosis of problems.

Figure 2:
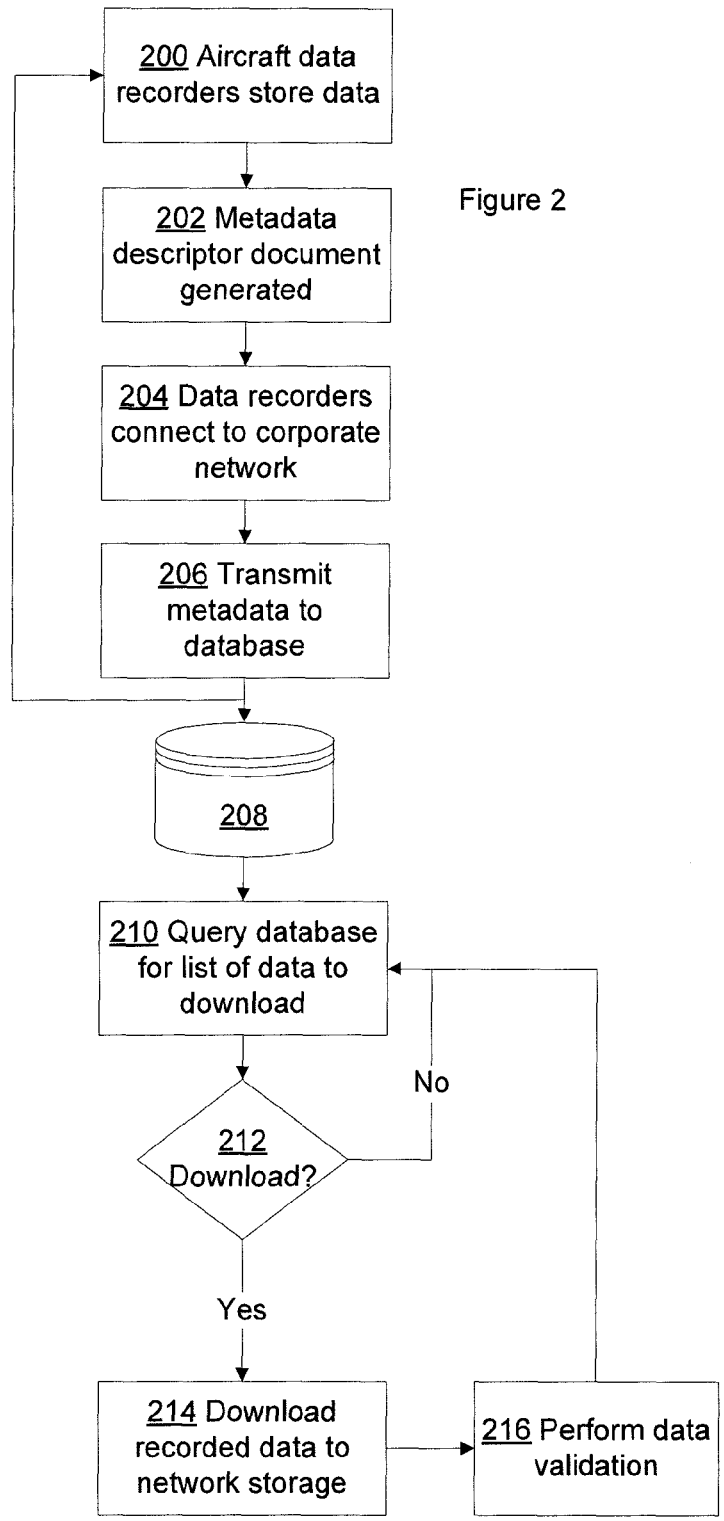
FIG. 2 is a schematic view of an embodiment of the process of using the invention.

Referring now to FIG. 2, an embodiment of a process for utilizing the aircraft troubleshooting network is depicted. During aircraft operation at step 200, data is collected by various aircraft instruments and recorded by aircraft data monitoring and recording system 102. The data may be stored in electronic files stored within system 102, in a database maintained as part of system 102, or in other known means for electronically storing data.

Periodically during data recording step 200, metafile descriptor documents are generated for the stored data. The metafile descriptor documents may be in the form of files stored on electronic media, they may be entries in a database on system 102 from which a document may be generated upon demand, as attributes of the stored data files, or they may be stored by system 102 in some other manner known for storing metadata for later use, generation or delivery.

When aircraft 100 is at a location with a wireless access point 104, system 102 connects to the network 106. The system 102 then transmits the metadata descriptor documents to control server 108. The metadata is then stored in database 208 on data storage server 110 and is available to the control server 108 and end user stations 112.

Control server 108 may periodically query the database 208 in step 210 to determine if metadata descriptor documents are present for data that has not yet been downloaded. Control server 108 may also query the database 208 upon receiving notice that system 102 has connected to the network 106, either directly from system 102 or from some other component of the invention. Control server retrieves a list of available metadata from database 208 and selects only those documents that meet the desired criteria for data download. These criteria include, without limitation, that the aircraft is currently online and connected to the network, the data has not yet been downloaded, the operating criteria of the aircraft such as flight parameters and engine statistics have certain characteristics such as flight information or engine run data. This allows the transmission of data to be controlled by the control server 108, and not performed automatically upon the occurrence of any certain event. This may be useful for a variety of reasons, including downloading data that may have been previously downloaded or selectively downloading data involving certain events or occurrences.

If the metadata matching the desired criteria is present in database 208 as determined at step 212, control server 108 then downloads the data from system 102 in step 214 and stores it on data storage server 110 or other network storage facilities. The data is then available to end user stations 112 for review and analysis at a later time. During the download process, known methods for securely transmitting data and preventing corruption such as performing checksum 216 are utilized to validate the data.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed:

1. A system for remotely monitoring the performance of an aircraft comprising:
    at least one aircraft data monitoring and recording system installed in an aircraft;
    a plurality of wireless access points connected to a wide area network at a plurality of aircraft service locations;
    a data storage server connected to the wide area network;
    a control server connected to the wide area network; and
    at least one remote end user station connected to the wide area network;
    wherein each of the at least one aircraft data and monitoring system records data for an aircraft, generates at least one metadata document describing the data, automatically connects to the control server via one of the plurality of wireless access points when at an aircraft service location, and uploads the at least one metadata document to the control server for storage on the data storage server; and
    wherein each of the at least one remote end user station selectively retrieves the data through the wide area network from the data storage server and connects via the wide area network to the aircraft data monitoring and recording system via one of the plurality of wireless access points.

2. The system of claim 1 wherein the control server periodically retrieves the at least one metadata document from the data storage server and selectively downloads the data from the aircraft monitoring and recording system via the network for storage on the data storage server.

3. The system of claim 2 further comprising an index maintained by the control server of aircraft data monitoring and recording systems currently connected to one of the plurality of wireless access points.

4. The system of claim 3 wherein the at least one remote end user station connects to one of the at least one aircraft data monitoring and recording systems selected from the index maintained by the control server.

5. The system of claim 4 wherein the at least one remote end user station performs aircraft diagnostic functions on one of the at least one aircraft data monitoring and recording systems.

6. The system of claim 5 further comprising a database on the data storage server of historical data downloaded from the at least one aircraft data monitoring and recording system.

7. The system of claim 6 wherein one of the at least one remote end user station performs diagnostic functions on the database of historical data for one of the at least one aircraft data monitoring and recording system.

8. The system of claim 7 wherein the control server prioritizes the download of data from the at least one aircraft data monitoring and recording system based on the occurrence of one or more priority flight events during recording of the data.

9. The system of claim 8 wherein the priority flight events are selected from the group consisting of flight date and time criteria are met, existence of certain system logic conditions, and exceeding of system parameter thresholds.

10. The system of claim 9 wherein the at least one metadata document includes an aircraft identifier, a data type identifier, data collection time information, flight event information and data location information.

11. A method for monitoring the performance of an aircraft utilizing the system of claim 1, comprising the steps of:
    recording aircraft data on the aircraft data monitoring and recording system;
    creating at least one metadata document describing the aircraft data;
    automatically connecting the aircraft data monitoring and recording system to one of the plurality of wireless access points; and
    initiating an upload of the at least one metadata document from the aircraft data monitoring and recording system to the data storage server selectively retrieving a set of metadata documents from the data storage server to the control server;

downloading the data described in the set of metadata documents from the aircraft data monitoring and recording system to the data storage server;

wherein the set of metadata documents is selectively retrieved based on criteria selected from the group consisting of prior download status, priority flight events, data collection time, and data type.

12. The method of claim 11 wherein the priority flight events are selected from the group consisting of existence of desired flight profile information, existence of desired system logic conditions and existence of exceeded system parameter thresholds.

13. The method of claim 11 further comprising the step of maintaining an index of the aircraft data monitoring and recording systems currently connected to one of the plurality of wireless access points.

14. The method of claim 13 further comprising the steps of:
remotely accessing a first aircraft data monitoring and recording system selected from the index from one of the at least one remote end user stations; and
performing aircraft diagnostic functions on the first aircraft data monitoring and recording system from the remote end user station.

15. The method of claim 14 further comprising the step of storing data downloaded from the at least one aircraft data monitoring and recording system in a historical database stored on the data storage server.

16. The method of claim 15 further comprising the step of using one of the at least one remote end user station to perform analytical functions on the data in the historical database for one of the at least one aircraft data monitoring and recording system.

* * * * *